Aug. 13, 1940.  H. H. STYLL  2,211,084
OPHTHALMIC MOUNTING
Filed June 24, 1938
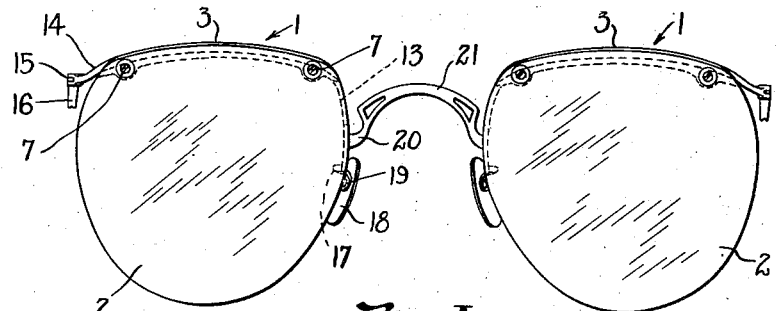
Fig. I
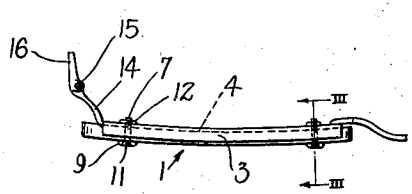
Fig. II
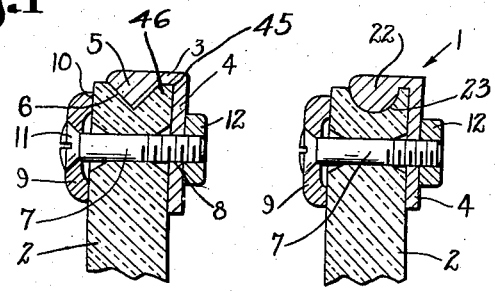
Fig. III  Fig. IV
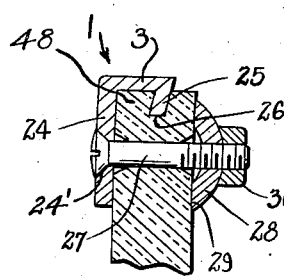
Fig. V
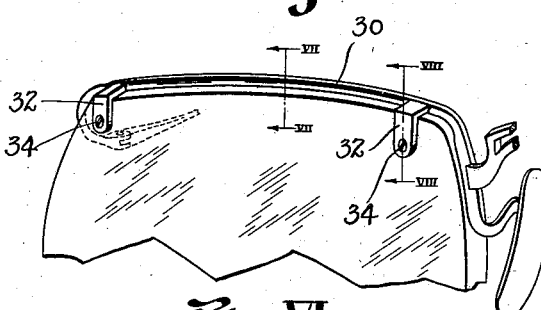
Fig. VI
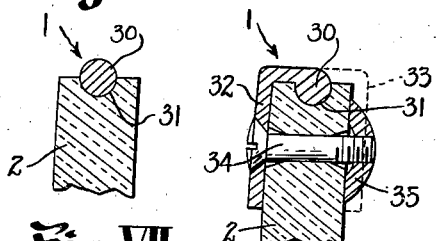
Fig. VII  Fig. VIII
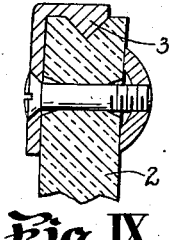
Fig. IX
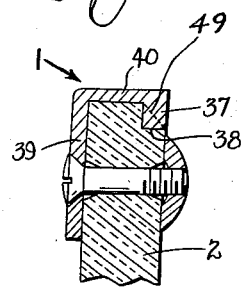
Fig. X
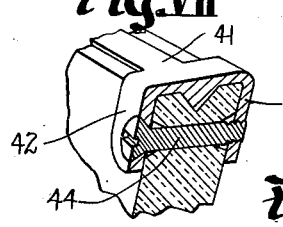
Fig. XI
INVENTOR.
Harry H. Styll.

Patented Aug. 13, 1940

2,211,084

UNITED STATES PATENT OFFICE 2,211,084

OPHTHALMIC MOUNTING

Harry H. Styll, Southbridge, Mass., assignor to American Optical Company, Southbridge, Mass., a voluntary association of Massachusetts Application June 24, 1938, Serial No. 215,518

2 Claims. (Cl. 88—47)

This invention relates to improvements in ophthalmic mountings and has particular reference to improved means and methods of making the same.

One of the principal objects of the invention is to provide an ophthalmic mounting having its lens supporting means positioned above the useful field of vision and has particular reference to the method of making the same.

Another object is to provide a relatively rigid connection between the bridge and temple supporting portions of the mounting and to which the lenses may be attached so as to be supported substantially free from strain during use.

Another object is to provide improved means and method of forming an ophthalmic mounting of the above character wherein the lens supporting means will be substantially invisible when the mounting is viewed from the front.

Another object is to provide a mounting of the above character so constructed that the lenses may be quickly and easily secured to their supporting means.

Other objects and advantages of the invention should become apparent from the following description taken in connection with the accompanying drawing and it will be apparent that many changes may be made in the details of construction, arrangement of parts, and methods shown and described, without departing from the spirit of the invention as expressed in the accompanying claims. I, therefore, do not wish to be limited to the exact details of construction, arrangement of parts, and methods shown, as the preferred forms only have been given by way of illustration.

Referring to the drawing:

Fig. I is a front elevation of an ophthalmic mounting embodying the invention;

Fig. II is a partial plan view of the mounting illustrated in Fig. I;

Fig. III is an enlarged fragmentary sectional view taken as on line III—III of Fig. II;

Fig. IV is a view generally similar to Fig. III illustrating a modified form of the invention;

Fig. V is a view generally similar to Fig. IV of a further modification;

Fig. VI is a fragmentary perspective view of another modified form of the invention;

Fig. VII is an enlarged fragmentary sectional view taken as on line VII—VII of Fig. VI;

Fig. VIII is an enlarged fragmentary sectional view taken as on line VIII—VIII of Fig. VI;

Fig. IX is a view generally similar to Fig. VIII indicating a further modified form of the invention;

Fig. X is a view generally similar to Fig. IX illustrating a further modification; and Fig. XI is a fragmentary perspective view shown partially in section of a still further modified form of the invention.

Mountings of the character described herein are known in the art as semi-rimless type mountings. Such mountings are so constructed as to provide substantially all of the desirable unobstructed vision features of a rimless type mounting and at the same time provide a substantially rigid and durable supporting structure for protecting the lenses against possible shock and strain during use. Many attempts have been made in the past to form such mountings but difficulty has been encountered in obtaining a construction having sufficient rigidity or resistance to distortion and which will protect the lenses against shock and strain and also be desirable from the aesthetical viewpoint.

It, therefore, is one of the prime objects of this invention to provide a semi-rim construction which will have the required rigidity and which will be desirable from the aesthetic viewpoint and relieve the lenses from shock and strain during the use of the mounting and permit the said lenses to be quickly and easily interchanged.

Referring more particularly to the drawing wherein like characters of reference designate like parts throughout the several views the device embodying the invention, as shown in Figs. I to III inclusive, comprises a pair of barlike members 1 shaped substantially to the upper contour shape of the lenses 2. The said barlike members 1 have a portion 3 shaped to engage the upper peripheral edge of the lens and have an integral substantially continuous depending lip 4 shaped to engage the rear surface of the lens adjacent the upper peripheral edge thereof. The portion 3 is provided with a V-shaped rib 5 on the inner surface thereof which is adapted to fit within a similarly shaped V groove 6 in the upper peripheral edge of the lens. This V-shaped rib functions in combination with the continuous depending lip 4 to increase the rigidity of the portion 3 and also provides means for aiding in maintaining the portion 3 and continuous depending lip 4 in desired fitted relation with the upper edge portion of the lens.

The portions 3 and 4 are secured in fitted relation with the lens by means of screws or like connecting means 7 which extend through spaced openings in the upper portion of the lens and are threaded into suitable threaded openings 8 formed in the continuous depending lip 4. Suitable cuplike washers 9, each having a peripheral edge 10 shaped to engage the front surface of the lens a distance substantially spaced from the edge of the connecting openings in the lens, are placed on the connecting screws 7 and are adapted to be drawn into engagement with the front surface of the lens by means of the enlarged heads 11 of said screws or like connecting means when the parts are secured together. A lock nut or the like 12 is positioned on the inner threaded end of the screw to hold the said screw against loosening during use.

The barlike members 1 are secured to depending barlike portions 13 adjacent the nasal edges of the lenses and are secured adjacent their outer temporal ends to rearwardly extending relatively long temple supporting members 14. The said temple supporting members 14 extend outwardly and rearwardly of the lens and are inclined slightly downwardly, as illustrated in Fig. I. The said members 14 may be formed of relatively rigid, pliable, or resilient material or may have portions thereof provided with one or more of said characteristics.

The rear ends of said members 14 are provided with a hinge connection 15 to which the temples 16 are pivotally attached.

The depending barlike portions 13 are shaped, during use, to follow substantially the nasal contour edges of the lenses in the rear of said edges and terminate adjacent the lower ends thereof in rearwardly extending nose pad supporting arms 17 to which suitable nose bearing pads 18 are pivotally attached, as illustrated at 19. The depending barlike portions 13 provide adjustable means to which the ends 20 of a bridge member 21 are attached. The said bridge member may be attached at any position intermediate the ends of the depending barlike portions 13 to vary the height of the bridge. The said depending barlike portions 13 may be formed of relatively rigid, pliable, or resilient material, or may have portions thereof possessing one or more of said characteristics.

The members 14 provide adjustable means whereby the distance between the temples may be varied and the height of the temples may be varied, and also permit the said temples to be located at different angles of inclination relative to the plane of the lenses.

The depending barlike portions 13 provide means whereby the distance between the centers of the lenses may be varied to compensate for variations in the inter-pupillary distances between the eyes of different individuals.

Although the said portions 13 and 14 have been specified, in some instances, as being formed resilient, it is to be understood that they may be adjusted to a given position and will thereafter be free to yield slightly from said positions of adjustment.

It is also to be understood that the said supporting arms 17 and portions 13 may be formed separate or integral as desired.

Fig. IV illustrates substantially the same details of construction as that described above except that the V-shaped rib 5 is replaced by a bead-like rib 22. The said bead-like rib is adapted to fit within a similarly shaped channel-like groove 23 formed in the upper contour edge of the lens. The function of said bead-like rib 22 is generally similar to that of the V-shaped rib 5, namely that of increasing the strength and rigidity of the barlike members 1.

It is to be understood that although applicant has shown and described screw type connecting means 7 having a lock nut 12 thereon, any type of commercially known connecting means may be used, such as a pin and tube jointed together by solder or other heat softening adhesive, or any other means.

Fig. V illustrates a further modification, differing from the above described constructions in that the depending continuous lip 24, simulating the lip 4, is positioned in front of the lens instead of in the rear of the lens, as illustrated in Figs. III and IV. In this instance the portion 3 is provided with a substantially continuous relatively short depending lip 25 adjacent the inner edge thereof. The said depending lip 25 is slightly deflected inwardly adjacent its lower edge and is adapted to fit within a similarly shaped groove 26 in the upper contour edge of the lens. The connecting screws 27 extend through suitable openings 24' formed in the front depending lip 24 and are threadedly connected with washer-like nuts 28 having circumferential edges 29 shaped to engage the rear surface of the lens in spaced relation with the connecting openings through the lens. Suitable lock nuts 30 may be provided for preventing loosening of the screw during use. It is to be understood that any other commercially known connecting means may be substituted for the screws 27.

In Figs. VI to VIII inclusive there is illustrated a further modification wherein a wire-like bar 30 is shaped to fit the upper contour edge of the lens and to have its lower portion rest within a channel-like groove 31 formed in said upper contour edge. The wire-like bar 30 is provided with spaced lens straps 32 which may be shaped to fit over the upper front surface of the lens or to fit over the upper rear surface of the lens, as illustrated by the dotted lines 33. The lens straps 32 are secured to the lens by means of connecting screws or the like 34 threadedly connected with cup shaped washer-like nuts 35.

Fig. IX illustrates a construction generally similar to that illustrated in Fig. VIII except for the substitution of a V-shaped barlike member 36 for the wire-like bar 30.

Fig. X illustrates a construction generally similar to that shown in Fig. VIII except that a rectangular shaped barlike member 37 fitting within a shouldered groove 38 in the upper rear edge of the lens is substituted for the V-shaped barlike member 36.

It is to be understood that a construction similar to Fig. X may be formed wherein the front depending portions of the lens straps may be replaced by a substantially continuous front depending lip 39 extending substantially throughout the width of the upper contour edge of the lens and joined to said rectangular barlike member 37 by spaced rib-like tie members 40. It is also to be understood that the said rib-like members 40 may be replaced with a substantially continuous web extending substantially throughout the length of said members 37 and 39.

In Fig. XI there is illustrated a further modification wherein a barlike member 41 having a triangular, rectangular, or circular cross section may be provided in combination with spaced lens strap ears 42 and 43 for securing the said bar 41 in fitted relation with the lens. Suitable connecting means 44 is provided for securing the ears 42 and 43 to the lens.

It is to be noted that the substantially rigid main barlike members 41 have their main reinforcing portion extended within a suitable groove formed in the upper contour edge of the lens so that the said barlike members will be relatively inconspicuous during use. The various different temple and bridge supporting portions of the mounting are adjustable so that they may be fitted to lenses of different sizes and so that the said mountings may be fitted to the facial characteristics of different individuals. It is also to be understood that the main bar-like members 1 may be adjusted within reasonable limits to fit different contour shapes of lenses.

The rib 5 and depending lip 4 are in spaced substantially parallel relation with each other and form a channel 45 in which a rib-like portion 46 on the upper contour edge of the lens is fitted. A similar channel is formed by the construction shown in Figs. IV, V, VIII, IX and X. This arrangement holds the rim sections 1 in fitted alignment with the upper contour edges of the lenses. The lenses may be secured to the rim sections 1 by placing a suitable cement or adhesive in said channels if desired. In such instances, the mechanical connecting means 7 may or may not be dispensed with as desired, particularly with a construction such as shown in Fig. V, where the lips 24 and 25 form a tapered channel in which the tapered rib-like portion 48 on the upper contour edge of the lens interlocks.

A suitable adhesive or cement may be placed in the grooves 6, 23, 26, 31, etc., in the upper contour edges of the lenses, if desired, to aid in securing the lenses to the rim sections 1.

A suitable adhesive or cement may be used beneath the cup-like members 9, etc., if desired.

The lens 2, as shown in Fig. X, may be beveled adjacent its upper rear edge, as illustrated at 49, instead of being formed with the shouldered groove 38. In this instance the inner surface of the depending lip 37 will be angled to fit the beveled edge 49.

It is also to be understood that any of the above described semi-rim constructions may be provided with double ear strap attachments to the lens, as shown in Fig. XI, if desired.

From the foregoing description it will be seen that simple, efficient and economical means and methods have been provided for accomplishing all of the objects and advantages of the invention particularly that of providing a semi-rim type mounting which is durable in construction and with which the lenses may be quickly and easily fitted, united and relieved from strain during use.

Having described my invention I claim:

1. A device of the character described comprising a supporting structure for use with lenses each having an upper contour edge having a depression therein and relatively continuous opposed major lens surfaces uninterrupted adjacent said upper edges, said lenses having perforations along said upper contour edges with one of said perforations located adjacent the upper nasal side of each lens and with the other located adjacent the upper temporal side of each lens, said supporting structure comprising rim sections of angle iron cross-sectional shape extending in a direction longitudinally of the upper edges of the lenses with one of the lips of the angle shaped to overlie and to follow substantially the shape of the upper contour edge portion of the respective lenses and having a projection on the inner surface thereof adapted to coact with said lens edge depression, and each having an angularly disposed lip extending in a direction longitudinally substantially the width of the upper portion of the respective lenses and shaped to overlie only an adjacent major side surface of said lenses when in position thereon with the inner surface of said lips substantially in the plane of said side surfaces of the lenses, said angularly disposed lips each having spaced perforations adapted to be aligned with the respective perforations in the lenses, said rim sections supporting portions which extend outwardly beyond the limits of the temporal ends of the angularly disposed lip portions and thence rearwardly to a temple connection and supporting portions which extend outwardly and downwardly beyond the limit of the nasal end of said angularly disposed portions of each of said rim sections with the said downwardly extending portions shaped to follow substantially the adjacent shape of the contour edges of the lenses when assembled therewith and when viewed from the front, bridge means connected to said downwardly extending portions at points spaced from the adjacent ends of said angularly disposed portions, means having a portion shaped to overlie the side surfaces of the lenses, opposite the depending lip portions, having perforations therein adapted to be aligned with the respective perforations in the lenses and means adapted to extend within said aligned perforations for securing the rim sections to the lenses.

2. In a device of the character described the combination of a pair of lenses each having an upper contour edge having a depression therein and relatively continuous opposed major lens surfaces uninterrupted adjacent said upper edges, said lenses having perforations along said upper contour edges with one of said perforations located adjacent the upper nasal side of each lens and with the other located adjacent the upper temporal side of each lens, said supporting structure comprising rim sections of angle iron cross-sectional shape extending in a direction longitudinally of the upper edges of the lenses with one of the lips of the angle overlying and following substantially the shape of the upper contour edge portion of the respective lenses and having a projection on the inner surface thereof adapted to coact with said lens edge depression and each having an angularly disposed lip extending in a direction longitudinally substantially the width of the upper portion of the respective lenses and overlying only an adjacent side surface of said lenses with the inner surface of said lips substantially in the plane of said side surfaces of the lenses, said angularly disposed lips each having spaced perforations aligned with the respective perforations in the lenses, said rim sections supporting portions extending outwardly beyond the limits of the temporal ends of the angularly disposed lip portions and thence rearwardly to a temple connection and supporting portions extending outwardly and downwardly beyond the limit of the nasal end of said angularly disposed portions of each of said rim sections with the said downwardly extending portions shaped to follow substantially the adjacent shape of the contour edges of the lens when viewed from the front, bridge means connected to said downwardly extending portions at points spaced from the adjacent ends of said angularly disposed portions, means having a portion shaped to overlie the side surfaces of the lenses, opposite the depending lip portions, having perforations therein aligned with the respective perforations in the lenses and means extending within said aligned perforations for securing the rim sections to the lenses.

HARRY H. STYLL.